Oct. 26, 1926.
B. H. URSCHEL
AUTOMOBILE LINK
Filed Oct. 6, 1924
1,604,247
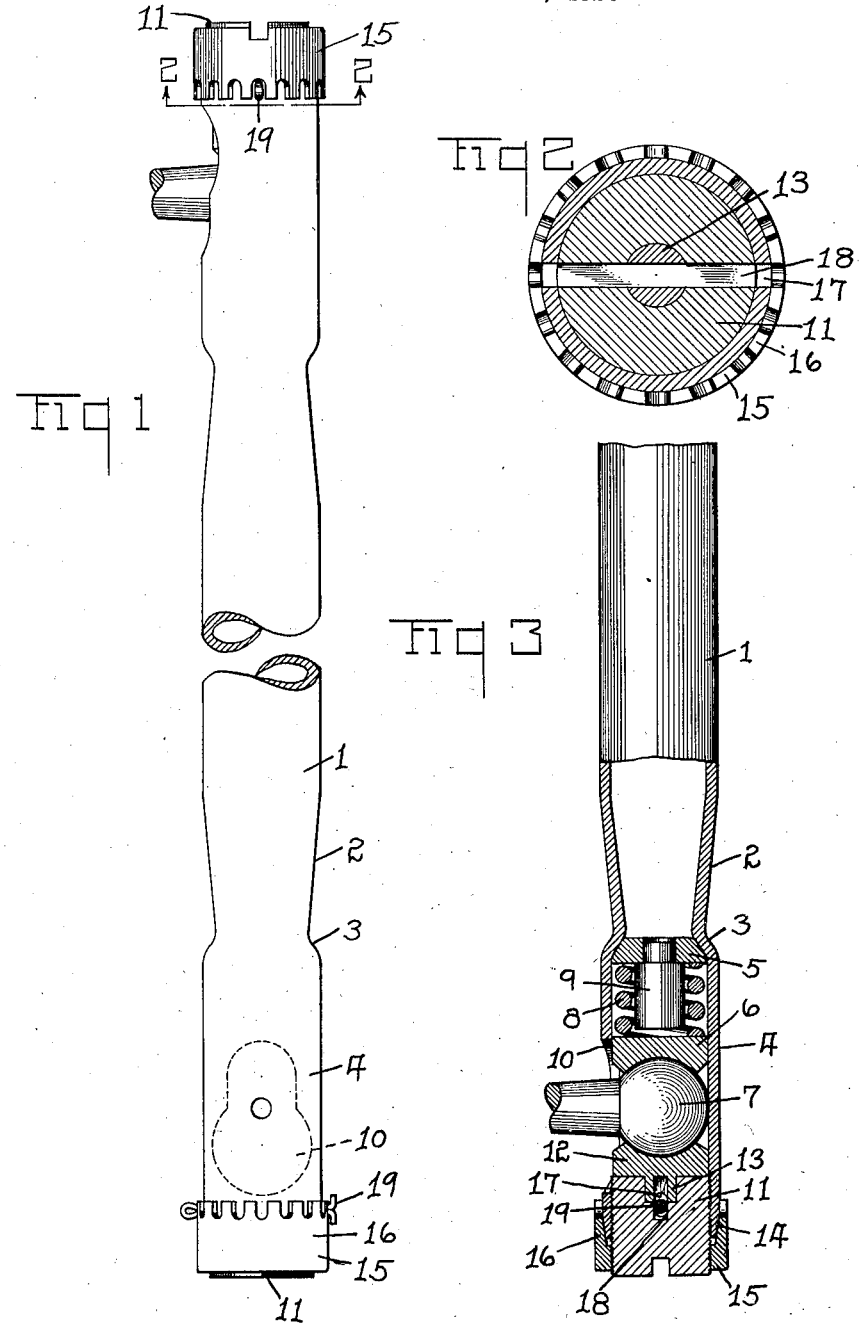

Patented Oct. 26, 1926.

1,604,247

UNITED STATES PATENT OFFICE.

BERTIS H. URSCHEL, OF BOWLING GREEN, OHIO.

AUTOMOBILE LINK.

Application filed October 6, 1924. Serial No. 741,849.

My invention has for its object to provide improved adjustable connecting parts for steering links, steering wheel connecting links and drag links, particularly, wherein the adjusting elements may be locked in position by a member that may be easily located and secured in position. In the preferred form of construction containing my invention, a tubular link is swaged to form a tapering neck, leaving a connector head having a diameter the same as the body portion of the link and wherein the head joins the neck by a round shoulder that forms within the head an efficient thrust bearing. Adjustable thrust bearing members are located in the head and are sustained by the shoulder and an adjustable plug that is inserted and secured in the head, means being provided for locking the adjustable elements in position.

Constructions containing the invention may in their details partake of different forms. To illustrate a practical application of the invention I have shown in the drawing an automobile link for connecting parts of the steering mechanism of an automobile and shall describe it hereinafter.

Figure 1 of the drawing illustrates a side view of a connecting link having adjustable thrust bearing parts. Figure 2 is a view of a section taken on the plane of the line 2—2 indicated in Fig. 1. Figure 3 is a view of a longitudinal section taken through an end portion of the link.

The link is formed of a hollow or tubular bar 1 having a swaged tapered portion 2 forming a neck and a shoulder 3 located near each end of the link, and so as to form the head 4 having a diameter substantially the same as that of the body portion of the link 1. The head 4 thus forms a socketed portion at each end of the link for receiving the parts of the automobile to which the link is connected, while the shoulder 3 forms a thrust bearing for sustaining the compression strains to which the link may be subjected. Since the tapered neck 2 and the shoulder 3 are formed by swaging, the wall is thickened and affords an increased area for resisting the compression at this point, which enables the link to withstand any hammering action that may be caused by the parts to which the links are connected. The body portion of the link being located more remote, its elasticity will absorb any such action to which the link may be subjected.

The block 5 may be located within the head 4 and shaped so as to fit the interior of the shoulder 3 and may be used for transmitting the pressure of a connecting part to the body portion of the link. A block 6 is also located in the head 4 and may be provided with a contour best suited for receiving the connecting part and form a seat for such connecting part within the head 4. In the form of construction shown, such connecting part may be provided with a substantially spherical head 7 and the block 6 may be provided with a concave contour that fits the head 7. A spring 8 may be located intermediate the blocks 5 and 6 for resiliently transmitting the movements of the heads 7 to the link. A stud 9 may be located in the block 5. It will afford a limiting stop for the movements of the block 6 towards the block 5, while at the same time the stud 9 will operate to hold the spring 8 in position.

The head 4 may be provided with a slot and eye opening 10 for receiving the head 7 of a steering knuckle arm or steering shaft arm and the end of the head may be threaded for receiving a threaded plug 11 to secure the head 7 within the head 4 of the link. Preferably, a block 12 having a contour best adapted to receive one side of the head 7 is located intermediate the plug 11 and the head 7. If desired, the block 12 may be provided with a projecting stud 13 and the plug 11 may be provided with a recess for receiving the stud 13. The plug 11 may be screwed into the head 4 to press the head 7 between the blocks 6 and 12, the blocks 6 being forced against the pressure of the spring 8 which in turn transmits its pressure to the block 5. Thus the head 7 will be secured in position within the head 4.

In order to lock the plug 11, the outer end of the head 4 may be tapered as at 14 and a threaded collar 15 may be provided with an interior conical or tapered flange that fits over the tapered portion 14 of the head. The collar 15 may be threaded on to the plug 11 and tightly secured on the end of the head 4. The edge of the flange 16 of the collar may be castellated, the head 4 may be provided with a slot 17 and the plug 11 may be provided with a slot 18 through which a cotter pin 19 may be inserted to securely lock the threaded parts together. Thus by the use of the single cotter pin, the threaded parts will be secured in their positions in the head 4 and the part to which the link is connected will be safely fastened within the head.

I claim:—

1. A hollow connecting link having a swaged tapered portion forming a tapered neck and a hollow head joined with the neck by a shoulder, a block fitting the interior surface of the shoulder for transmitting compressional strains to the link body, a connecting member located within the head, a plug threaded into the head for securing the connecting member within the head, a castellated collar threaded on to the plug, the end of the head having an exterior conical surface and the castellated collar having an interior conical surface fitting the conical surface of the head for frictionally securing the head, the head and the plug having slots and a cotter pin extending through the castellated collar, the head and the plug.

2. A hollow connecting link having a swaged tapered portion forming a tapered neck and a hollow head joined with the neck by a shoulder, a block fitting the interior surface of the shoulder for transmitting compressional strains to the link body, a connecting member located within the head, a second block fitting the connecting member and located in the head, a plug threaded into the head for securing the connecting member between the blocks and within the head, the second block having a slot, a collar threaded on to the plug, the end of the head having an exterior conical surface, the collar having an interior surface fitting the conical surface of the head for frictionally securing the head, the head and the plug having slots and a pin extending through the head, the plug and the second block.

In testimony whereof I have hereunto signed my name to this specification.

BERTIS H. URSCHEL.